United States Patent
Lin

(10) Patent No.: US 10,935,643 B2
(45) Date of Patent: Mar. 2, 2021

(54) SENSOR CALIBRATION METHOD AND SENSOR CALIBRATION APPARATUS

(71) Applicant: DENSO CORPORATION, Kariya (JP)

(72) Inventor: Wencheng Lin, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/715,150

(22) Filed: Dec. 16, 2019

(65) Prior Publication Data
US 2020/0191927 A1    Jun. 18, 2020

(30) Foreign Application Priority Data
Dec. 18, 2018 (JP) .............................. JP2018-236445

(51) Int. Cl.
    *G01S 7/497*        (2006.01)
    *H04N 5/225*      (2006.01)
    *G01S 17/931*     (2020.01)

(52) U.S. Cl.
    CPC ............ *G01S 7/497* (2013.01); *G01S 17/931* (2020.01); *H04N 5/2256* (2013.01)

(58) Field of Classification Search
    CPC .............................. G06T 7/80; B60R 2300/402
    See application file for complete search history.

(56) References Cited

U.S. PATENT DOCUMENTS

| | | | | |
|---|---|---|---|---|
| 2004/0133376 | A1* | 7/2004 | Uffenkamp | G06T 7/80 702/104 |
| 2006/0290920 | A1* | 12/2006 | Kampchen | G01S 7/4972 356/139.04 |
| 2008/0031514 | A1* | 2/2008 | Kakinami | G06T 7/80 382/154 |
| 2009/0299684 | A1* | 12/2009 | Imanishi | G06T 7/80 702/150 |
| 2010/0179781 | A1* | 7/2010 | Raphael | G06T 7/80 702/94 |
| 2012/0320190 | A1* | 12/2012 | Natroshvili | G06T 7/85 348/135 |
| 2016/0236619 | A1* | 8/2016 | Tanaka | H04N 7/181 |
| 2016/0343136 | A1* | 11/2016 | Heidi | G06T 7/80 |
| 2017/0343654 | A1 | 11/2017 | Valois et al. | |
| 2019/0102911 | A1* | 4/2019 | Natroshvili | G06T 7/80 |
| 2019/0324129 | A1* | 10/2019 | Castorena Martinez | G01S 7/497 |

FOREIGN PATENT DOCUMENTS

EP         2590408 A4 *   1/2016 ............. H04N 7/181

\* cited by examiner

*Primary Examiner* — Mainul Hasan
(74) *Attorney, Agent, or Firm* — Maschoff Brennan

(57) ABSTRACT

A sensor calibration apparatus for calibrating a sensor mounted to a vehicle is provided. The sensor calibration apparatus includes a projection instruction unit that causes a projection device, which is mounted to the vehicle and projects light, to project an optical image representing a calibration marker onto a detection range of the sensor, an optical image information acquisition unit that acquires optical image information detected by the sensor, and a calculation unit that calculates a calibration value of the sensor based on the optical image information.

22 Claims, 7 Drawing Sheets

SENSOR CALIBRATION METHOD AND SENSOR CALIBRATION APPARATUS

CROSS REFERENCES TO RELATED APPLICATIONS

The present application is based on Japanese Patent Application No. 2018-236445 filed on Dec. 18, 2018, the disclosure of which is incorporated herein by reference.

TECHNICAL FIELD

The present disclosure relates to a sensor calibration method and a sensor calibration apparatus for calibrating a sensor mounted to a vehicle.

BACKGROUND

There is a calibration system that calibrates a camera or a Lidar mounted to a vehicle.

SUMMARY

The present disclosure provides a sensor calibration method and a sensor calibration apparatus.

In an example of the present disclosure, a calibration method for calibrating a sensor mounted to a vehicle comprises: using a projection device mounted to the vehicle, projecting an optical image representing a calibration marker onto a detection range of the sensor; obtaining optical image information detected by the sensor; and calculating a calibration value of the sensor based on the optical image information.

In an example of the present disclosure, a sensor calibration apparatus for calibrating a sensor mounted to a vehicle causes a projection device, which is mounted to the vehicle, to project an optical image representing a calibration marker onto a detection range of the sensor. The apparatus acquires optical image information detected by the sensor. The apparatus calculates a calibration value of the sensor based on the optical image information.

BRIEF DESCRIPTION OF THE DRAWINGS

Objects, features and advantages of the present disclosure will become more apparent from the following detailed description made with reference to the accompanying drawings. In the drawings.

DETAILED DESCRIPTION

Figure 1:
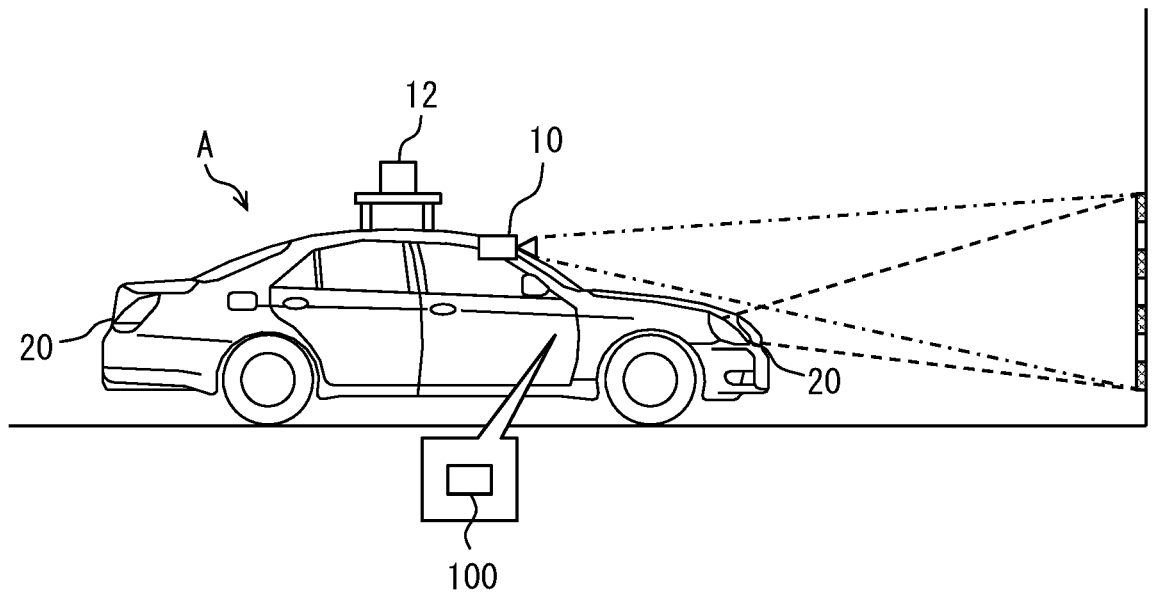
FIG. 1 is a schematic diagram illustrating a configuration related to a sensor calibration method of a first embodiment.
Figure 2:
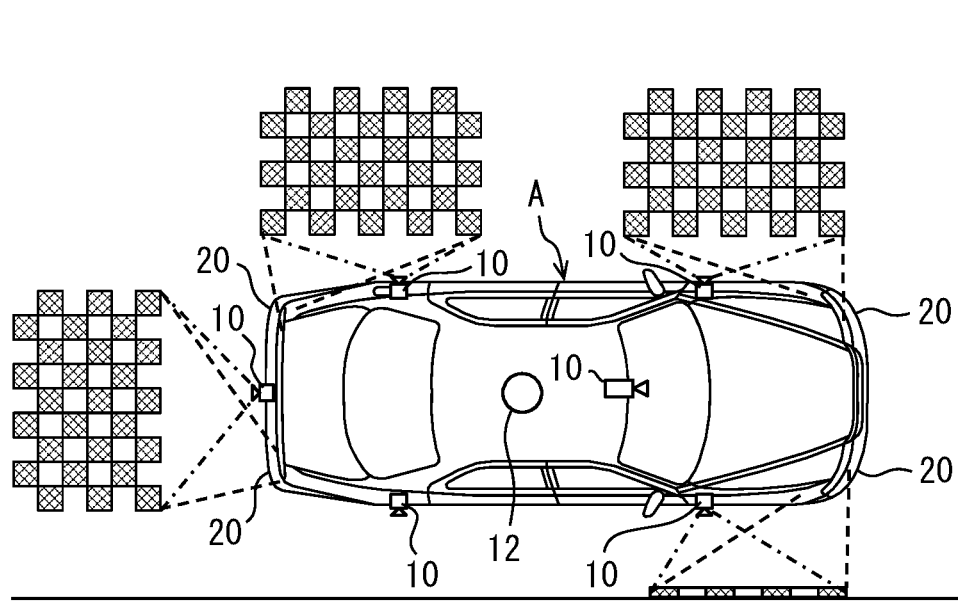
FIG. 2 is a diagram illustrating a top view of the configuration of FIG. 1.

There is a calibration system that calibrates a camera or a Lidar mounted to a vehicle. In this calibration system, a calibration marker for being detected by the camera or the Lidar may be installed around a turntable that rotates the vehicle. The calibration system may calculate a calibration value of the camera or the Lidar based on detection information of the calibration marker.

This calibration system requires a facility having therein an installed calibration marker. When the calibration marker is installed as a non-transitory tangible physical entity, an installation space, installation work, and the like are required, which may increase the cost of preparing an environment for calibrating the camera or the Lidar.

It is an object of the present disclosure to provide a sensor calibration method and a sensor calibration apparatus that can calibrate a sensor without using a non-transitory tangible calibration marker.

In an aspect of the present disclosure, a sensor calibration method implemented by a computer to calibrate a sensor mounted to a vehicle is provided. The sensor calibration method is performed by at least one processor and comprises: using a projection device which is mounted to the vehicle and which projects light, projecting an optical image representing a calibration marker onto a detection range of the sensor; obtaining optical image information detected by the sensor; and calculating a calibration value of the sensor based on the optical image information.

In another aspect of the present disclosure, a sensor calibration apparatus for calibrating a sensor mounted to a vehicle is provided. The sensor calibration apparatus comprises: a projection instruction unit that causes a projection device, which is mounted to the vehicle and projects light, to project an optical image representing a calibration marker onto a detection range of the sensor; an optical image information acquisition unit that acquires optical image information detected by the sensor; and a calculation unit that calculates a calibration value of the sensor based on the optical image information.

In the above method and apparatus, the calibration marker for calculation of the calibration value of the sensor is projected as the optical image from the projection device. Thus, a facility in which a non-transitory tangible physical entity serving as a calibration marker is installed becomes unnecessary. It is therefore possible to provide a sensor calibration method and a sensor calibration apparatus that can calibrate a sensor without using the non-transitory tangible calibration marker.

First Embodiment

A sensor calibration apparatus according to a first embodiment will be described with reference to FIGS. 1-6. In the first embodiment, functions of the sensor calibration apparatus are implemented in a vehicle-mounted ECU (Electronic Control Unit) 100. The vehicle-mounted ECU 100 may be one of electronic control units mounted to the vehicle A, and is a vehicle-mounted computer that enables automated driving of the vehicle A. The vehicle A mounted with the vehicle-mounted ECU 100 may be an unmanned driving vehicle that provides mobility service such as automatic transportation of people and luggage, car sharing, and ride sharing. The vehicle-mounted ECU 100 is directly or indirectly electrically connected to a bus of the vehicle-mounted network 45 and two or more vehicle-mounted sensors. The vehicle A mounted with the vehicle-mounted ECU 100 may be also called a host vehicle.

Many vehicle-mounted devices are directly or indirectly electrically connected to a communication bus of the vehicle-mounted network 45. The vehicle-mounted network 45 can provide the vehicle-mounted ECU 100 with a variety of vehicle information which is output to the communication bus. The vehicle-mounted network 45 provides the vehicle-mounted ECU 100 with, for example, vehicle speed information indicating traveling speed of the vehicle A, vehicle position information indicating a current location of the vehicle A, and the like as information necessary for the calibration processing described below.

The vehicle-mounted sensors are mounted to the vehicle A and acquire a variety of information necessary for automated driving or advanced driver-assistance. The vehicle-mounted sensors include a camera 10, an optical sensor such as a Lidar 12, a millimeter wave radar 13, and a sonar 14. The vehicle-mounted sensors may be installed at mutually different positions with mutually different postures.

The camera 10, the Lidar 12, the millimeter wave radar 13, and the sonar 14 are autonomous sensors that recognize the surrounding environment of the vehicle A. These autonomous sensors detect movable objects such as pedestrians and other vehicles, and stationary objects such as traffic signals, road signs and road markings such as lane markings and pedestrian crossings. Each autonomous sensor successively outputs measurement information which may include detection results of a movable object and a stationary object to the vehicle-mounted ECU 100. A respective autonomous sensor may include two or more sensors. Some of the autonomous sensors may be omitted.

The camera 10 is an imaging device that images the surrounding of the vehicle A at wavelengths in a visible light range and generates an image. The camera 10 includes an image sensor such as a CMOS sensor and a control circuit that performs image processing on detection information of the image sensor. In the camera 10, the control circuit generates image data from the detection information, and successively outputs the image data to the vehicle-mounted ECU 100. Alternatively, the camera 10 may extract specific information from the detection information by image analysis processing and output the extracted information to the vehicle-mounted ECU 100. For example, two or more cameras 10 may be mounted to the vehicle, and may have different areas around the vehicle A as their imaging ranges (detection ranges).

The Lidar 12 irradiates laser light toward a traveling direction of the vehicle A or a right and/or left forward direction and receives the laser light reflected at a movable object or a stationary object existing in the irradiation direction. Further, by receiving disturbance light other than the laser light, the Lidar 12 can detect brightness (light and darkness) caused by light projected from a light source other than laser light. The Lidar 12 outputs these detection results to the vehicle-mounted ECU 100 as point group information. The Lidar 12 may be a scanning type such as a rotating mirror type, a MEMS type, and a phased array type, or may be a non-scanning type such as a flash type.

The millimeter wave radar 13 irradiates millimeter wave toward, for example, the traveling direction of the vehicle A, and acquires the detection result by processing including receiving the millimeter wave reflected at the movable object or the stationary object existing in the traveling direction. The sonar 14 irradiates ultrasonic wave toward the periphery of the vehicle A, and acquires detection information by processing including receiving the ultrasonic wave reflected at a movable object or a stationary object existing in the irradiation direction.

The illumination device 20 includes a light source, and is provided to the vehicle A. The illumination device 20 illuminates the surroundings of the vehicle A by irradiation of illumination light. The illumination device 20 includes, for example, a headlight which irradiates illumination light to the front of the vehicle A and a taillight which irradiates illumination light to the rear of the vehicle A.

The illumination device 20 is configured to be able to project the below-described projection data item output from the vehicle-mounted ECU 100, as an optical image. The illumination device 20 includes, for example, a laser light source, a MEMS mirror, and a control circuit. The illumination device 20 generates a projection data item-based optical image onto a projection surface by performing scanning control of the laser light with the MEMS mirror. The illumination device 20 can also project an optical image onto a left and/or right side of the vehicle A by controlling the MEMS mirror. The illumination device 20 is an example of a projection device.

The vehicle-mounted ECU 100 includes a processing device that combines the vehicle position information and the measurement information acquired from each vehicle-mounted sensor and recognizes the traveling environment. The vehicle-mounted ECU 100 continuously repeats various processes including a process of specifying the position of the host vehicle and a process of calculating the relative distance to objects around the host vehicle. The vehicle-mounted ECU 100 includes, as its main component, a control circuit. The control circuit includes a processor 61, a RAM 62, a memory device 63, an input/output interface 64, and the like.

The processor 61 is hardware for performing processing in cooperation with the RAM 62, and can execute various programs. The memory device 63 includes a nonvolatile storage medium, and stores various programs executed by the processor 61. The memory device 63 stores at least a camera calibration program related to the calibration for the camera 10.

The vehicle-mounted ECU 100 stores an external parameter for each vehicle-mounted sensor in the database 55. The external parameter includes a group of numerical values that is set between two vehicle-mounted sensors, and that geometrically associates the measurement information acquired by one of the two vehicle-mounted sensors with the measurement information acquired by the other of the two vehicle-mounted sensors. Specifically, the external parameter includes parameters defined in the form of 6 axes (x, y, z, roll, pitch, yaw) corresponding to the mounting position and mounting posture (orientation) of a respective vehicle-mounted sensor. In the present embodiment, one of the vehicle-mounted sensors acts as a master sensor serving as a reference for setting the external parameter. For each vehicle-mounted sensor except the master sensor, the database 55 stores the external parameter relative to the master sensor. With a process of applying the external parameter to the measurement information of the vehicle-mounted sensor, the position coordinates of the detection object in the coordinate system of the vehicle-mounted sensor can be converted into the position coordinates in the coordinate system of the master sensor.

The vehicle-mounted ECU 100 calibrates the external parameter of the camera 10. In particular, the vehicle-mounted ECU 100 of the first embodiment executes calibration processing for calibrating the external parameter that is set between the camera 10 and the Lidar 12. The vehicle-mounted ECU 100 performs sensor fusion of the camera 10 and the Lidar 12 using the calibrated external parameter and associates the coordinates indicating the same geometric point to improve detection accuracy of the optical sensor.

Figure 3:
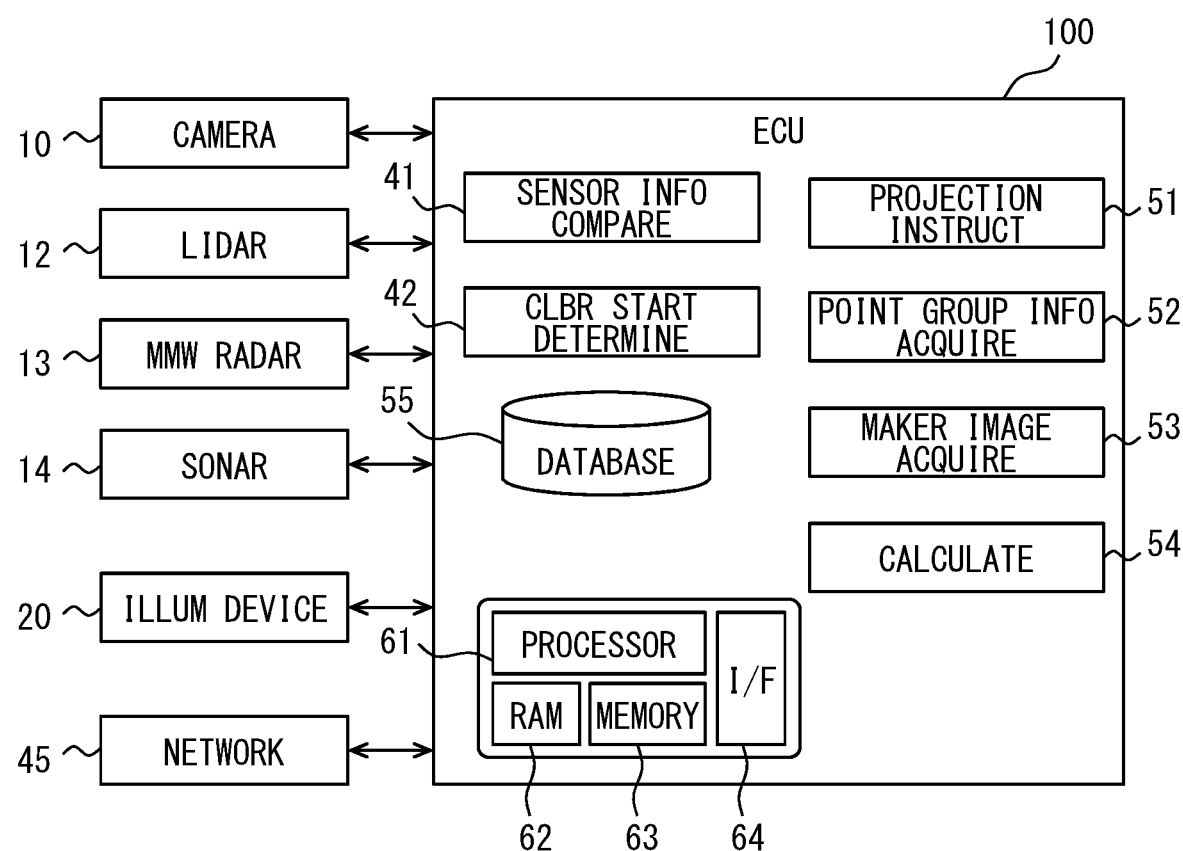
FIG. 3 is a block diagram of a vehicle-mounted ECU.

As shown in FIG. 3, the vehicle-mounted ECU 100 includes a sensor information comparison unit 41 and a calibration start determination unit 42 as functional blocks related to a calibration start determination process of the camera 10. The vehicle-mounted ECU 100 includes a projection instruction unit 51, a point group information acquisition unit 52, a marker image acquisition unit 53, and a calculation unit 54 as functional blocks related to the calibration processing for the camera 10.

The sensor information comparison unit 41 compares a detection result of a predetermined detection object imaged by the camera 10 with a detection result of the detection object detected by the vehicle-mounted sensor other than the camera 10. Based on the comparison result, the sensor information comparison unit 41 determines whether it is necessary to calibrate the camera 10. The vehicle-mounted sensor other than the camera 10 may be the Lidar 12, the millimeter wave radar 13, the sonar 14, or the like. For example, by comparing the detection result of the camera 10 with the detection result of the Lidar 12, the sensor information comparison unit 41 can more reliably determine whether it is necessary to calibrate the external parameter set between the camera 10 and the Lidar 12. When the detection result of the camera 10 is deviated from the detection result of the comparison counterpart, the sensor information comparison unit 41 determines that the calibration processing is necessary and the sensor information comparison unit 41 sets a flag indicating that it is necessary to calibrate the camera 10, as a calibration required flag.

For example, the sensor information comparison unit 41 performs tracking of a detection object (e.g., another vehicle, a road installation, etc.) using image data and using the point group information, and determines whether the coordinates of the detection object calculated from the image data and the coordinates of the detection object calculated from the point group information substantially match each other. When the coordinates of the detection object substantially match each other, the sensor information comparison unit 41 determines that it is unnecessary to calibrate the camera 10. On the other hand, when the coordinates of the detection object do not substantially match each other, the sensor information comparison unit 41 determines that it is necessary to calibrate the camera 10. For example, the image data and the point group information that are acquired for executing a predetermined driver assistance process are used for the sensor information comparison unit 41 to performs the above-described comparison.

When the calibration-required flag is set, the calibration start determination unit 42 determines whether or not the calibration processing is startable. When the calibration marker described below is projectable, the calibration start determination unit 42 determines that the calibration processing is startable. Specifically, the calibration start determination unit 42 determines whether an arrival condition and a vehicle stop condition are met. The arrival condition is a condition that the vehicle A has arrived at a place where the calibration marker is projectable. The vehicle stop condition is a condition that the vehicle A is in a stopped state. When both the arrival condition and the stop condition are met, the calibration start determination unit 42 determines that the calibration processing is startable.

The arrival condition is determined to be met when, for example, it is determined based on the host vehicle position information that the vehicle A has arrived at a predetermined place of a preset facility. This facility has a relatively flat wall, floor and the like that enable the calibration marker to be projected substantially without distortion. The facility is, for example, a garage or a parking lot of a service provider. The predetermined place of the facility is an example of a predetermined place. A distance from a projection plane may be preset at a time of manufacture, factory shipment, or the like. In this case, the service provider is provided with information regarding a suitable environment of the vehicle A for the calibration, and based on this information, sets the predetermined place of the facility where the vehicle A is to be parked. The vehicle stop condition is determined to be met when it is determined based on, for example, the vehicle speed information, that the vehicle speed of the vehicle A becomes zero. Alternatively, the stop condition may be determined to be met when a travel driving source of the vehicle A is stopped.

Based on determining by the calibration start determination unit 42 that the calibration processing is startable, the projection instruction unit 51 outputs: a signal for instructing the illumination device 20 to project the calibration marker; and the projection data item. The projection instruction unit 51 successively reads projection data items of two or more calibration markers pre-stored in the memory device 63 or the like and outputs the projection data items to the illumination device 20 to project the optical images of the two or more calibration markers having different projection forms. In the example shown in FIG. 1, the projection instruction unit 51 causes the illumination device 20 to project a calibration marker onto a wall surface in front of the vehicle A. In the example shown in FIG. 2, the projection instruction unit 51 causes the illumination device 20 to project the calibration marker onto a side wall surface and a side floor surface of the vehicle A.

Figure 4:
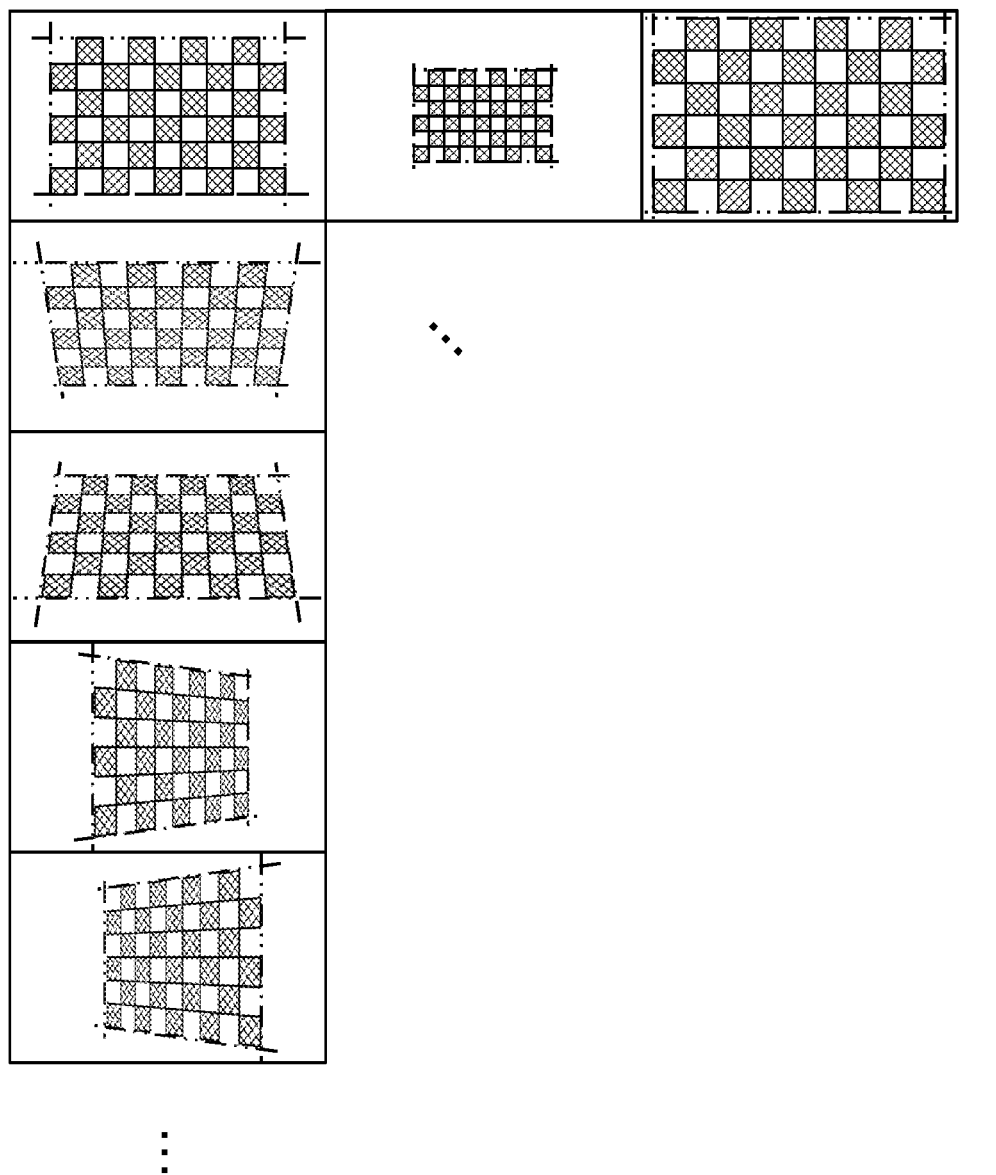
FIG. 4 is a diagram illustrating a projection form of a calibration marker.

The calibration marker is provided with a mark pattern having multiple feature points that are extracted by image analysis processing. The calibration marker is represented as a geometric pattern in which predetermined-shaped geometric forms are regularly arranged, and exhibits regularly arranged feature points. As an example, as shown in FIG. 4, the calibration marker may be a grid-like geometric pattern in which white rectangles and black rectangles are alternately arranged two-dimensionally. Such a pattern is called a chessboard pattern or a checkerboard pattern. In the case of this calibration marker, the intersections of the rectangles are extracted as the feature points. In the pattern of FIG. 4, the white rectangular portion is represented as a portion illuminated with the light, and the black rectangular portion is represented as a portion not illuminated with the light.

For example, the information on the calibration markers to be projected is stored as two or more projection data items having different shapes and sizes. For example, when the rectangular chessboard pattern shape of the calibration marker viewed from the front is called a basic shape, the different shapes of the stored projection data items include the basic shape and perspective shapes that are shapes when the basic shape is viewed obliquely. That is, in addition to the basic shape, shapes different from the basic shape in inclination with respect to the projection plane are stored. In other words, the perspective shapes are shapes obtained by deforming the basic shape by affine transformation. The perspective shapes include, for example, at least four shapes obtained by obliquely viewing the basic shape from four directions, up, down, left, and right directions with respect to the front view. Furthermore, two or more projection data items having different sizes are stored for each of the basic shape and the perspective shapes. For example, about 20 patterns of projection data items are stored.

The projection instruction unit 51 successively selects the projection data item from the two or more projection data items described above and successively outputs the selected projection data item to the illumination device 20 to project the calibration marker. Moreover, the projection instruction unit 51 designates a projection direction of the illumination device 20 so that the calibration marker as a whole is in the imaging range of the camera 10 targeted for the calibration. The designated projection direction is, for example, preset based on the imaging range of a respective camera 10. Alternatively, the projection instruction unit 51 may, on an as-needed basis, adjust the projection direction based on the image data at a time of actual projection.

The point group information acquisition unit 52 acquires the point group information of the calibration marker from the Lidar 12 and successively outputs it to the calculation unit 54. The marker image acquisition unit 53 acquires calibration marker image data (marker image data) captured by the camera 10 as optical image information. The marker image acquisition unit 53 successively outputs the acquired image data to the calculation unit 54. The marker image acquisition unit 53 is an example of an optical image information acquisition unit.

The calculation unit 54 generates the external parameter of the camera 10 relative to the Lidar 12 based on the marker image data and the point group information. For example, the position coordinates of the feature points of the calibration marker extracted from the point group information are treated as substantially true values by the calculation unit 54. Then, the calculation unit 54 generates the external parameter that brings the position coordinates of the feature points of the calibration marker extracted from the marker image data close to the true values.

The calculation unit 54 generates the external parameter for each of the calibration markers having different projection forms. By performing processing such as averaging of the generated external parameters, the calculation unit 54 calculates the calibration value that is finally applied to the calibration of the camera 1. The calculation unit 54 calculates the calibration value as an offset value relative to the current external parameter. Alternatively, the calculation unit 54 may calculate the external parameter itself as the calibration value. The calculation unit 54 stores the calculated calibration value in the database 55. The stored calibration value is used for correcting the image data output from the camera 10. Alternatively, the calibration value may be output to the control circuit of the camera 10 and used for correction processing performed at a time when the camera 10 generates image data.

Next, an example of processing executed by the vehicle-mounted ECU 100 according to the first embodiment will be described with reference to the flowcharts of FIGS. 5 and 6. First, a determination process for starting the calibration shown in FIG. 5 will be described. The vehicle-mounted ECU 100 starts the process shown in FIG. 5 during traveling of the vehicle A.

First, at S10, the vehicle-mounted ECU 100 acquires the image data of a detection object around the vehicle A detected by the camera 10. At S20, the vehicle-mounted ECU 100 acquires sensing data (for example, point group information of the Lidar 12) of an object detected by the vehicle-mounted sensor other than the camera 10. Next, at 530, the vehicle-mounted ECU 100 performs matching of the image data and the sensing data to compare the detection results of the two data. At 540, based on the comparison result in 530, the vehicle-mounted ECU 100 determines whether or not the position coordinates of the detection object detected from the image data substantially match the position coordinates of the detection object detected from the sensing data. When it is determined in 540 that the detection results match each other, the process of the flowchart shown in FIG. 5 is ended because it is unnecessary to calibrate the camera 10.

When it is determined in S40 that the detection results do not match each other, the process proceeds to 550. At 550, the vehicle-mounted ECU 100 determines whether or not the vehicle A has arrived at a predetermined place in the facility. When it is determined that the vehicle A has not arrived at the predetermined place, the determination at S50 is repeated until the vehicle A has arrived at the predetermined place. When the vehicle A has arrived at the predetermined place, the process proceeds to S55. At S55, the vehicle-mounted ECU 100 determines whether the vehicle A has stopped. When the vehicle has not stopped, the determination at S55 is repeated until the vehicle is stopped. When it is determined that the vehicle has stopped, the process proceeds to S60. At S60, the vehicle-mounted ECU 100 performs the calibration processing for the camera 10, and after performing the calibration processing, the vehicle-mounted ECU 100 ends the process of the flowchart of FIG. 5.

Next, details of the calibration processing at S60 will be described with reference to the flowchart of FIG. 6. First, at S61, the vehicle-mounted ECU 100 selects a projection data item from among the projection data items and output the selected projection data item to the illumination device 20, and instructs the illumination device 20 to project the projection data item.

At S62, the vehicle-mounted ECU 100 acquires marker image data from the camera 10. Next, at S63, the vehicle-mounted ECU 100 acquires the point group information of the calibration marker from the Lidar 12. Next, at S64, the vehicle-mounted ECU 100 extracts feature points of the calibration marker from the acquired marker image data and feature points of the calibration marker from the acquired point group information. Next, at S65, the vehicle-mounted ECU 100 generates the external parameter based on the extracted position coordinates of the feature points. The generated external parameter is temporarily stored in the RAM 62.

Next, at S66, the vehicle-mounted ECU 100 determines whether or not the projection data items for all the calibration markers have been projected. When it is determined that not all the projection data items have been projected, the process proceeds to S67. At S67, the vehicle-mounted ECU 100 changes the set projection data item into one that has not been projected, and the process returns to S62.

When it is determined in S66 that all the calibration markers of the projection data items have been projected, the process proceeds to S68. At S68, the vehicle-mounted ECU 100 calculates the calibration value from the two or more generated external parameters. At S69, the vehicle-mounted ECU 100 stores the calculated calibration value in the database 55, and the calibration processing is ended.

Next, the configuration and technical effects of the vehicle-mounted ECU 100 according to the first embodiment will be described.

The vehicle-mounted ECU 100 includes the projection instruction unit 51. The projection instruction unit 51 causes the illumination device 20, which is mounted to the vehicle A and projects the light, to project an optical image representing a calibration marker onto the imaging range of the camera 10. The vehicle-mounted ECU 100 includes the marker image acquisition unit 53 and the calculation unit 54. The marker image acquisition unit 53 acquires marker image data of the calibration marker imaged by the camera 10. The calculation unit 54 calculates the calibration value of the camera 10 based on the marker image data.

With this configuration, the calibration marker for calculation of the calibration value of the camera 10 is projected from the illumination device 20 as the optical image. Because of this, a facility in which the calibration marker is installed as a non-transitory tangible physical entity becomes unnecessary. It is therefore possible to provide the sensor calibration method and the vehicle-mounted ECU 100 that can calibrate the sensor without using the non-transitory tangible calibration marker.

Moreover, the above vehicle-mounted ECU 100 enables suppression of a time and a work for the following: a person in charge of the service provider prepares and maintains the facility for the calibration and/or moves the vehicle A to an external facility, in particular after the shipment of the vehicle A. Therefore, continued calibration of the camera 10 after the shipment of the vehicle A is performable at low cost.

The projection instruction unit 51 causes the illumination device 20, which illuminates the surroundings of the vehicle A, to project a calibration marker. This can eliminate an additional light source for projecting the calibration marker. Moreover, since the illumination device 20 is usually mounted to the vehicle in such a state where its optical axis with respect to the vehicle body is adjusted, the calibration of the camera 10 is executable in a state in which the axial deviation with respect to the vehicle coordinate system is relatively suppressed.

When an optical image representing the calibration marker is projected, the vehicle-mounted ECU 100 causes two or more optical images having different projection forms to be projected. This enables the vehicle-mounted ECU 100 to calculate the calibration value using two or more marker image data items having different projection forms. Therefore, the vehicle-mounted ECU 100 can further increase the accuracy of the calculated calibration value.

The vehicle-mounted ECU 100 causes two or more calibration markers having different projected sizes to be projected. Accordingly, the vehicle-mounted ECU 100 can acquire the maker image data of the two or more calibration markers, like the vehicle-mounted ECU 100 acquires the maker image data of the non-transitory tangible calibration maker two or more times while the distance between the non-transitory tangible calibration maker and the vehicle A is being changed. Therefore, the vehicle-mounted ECU 100 can further suppress the space for calibration as compared with a case where the non-transitory tangible calibration marker is used.

The vehicle-mounted ECU 100 causes two or more calibration markers including a basic shape and a perspective shape corresponding to an obliquely-viewed basic image to be projected. Accordingly, the vehicle-mounted ECU 100 can acquire the maker image data of the two or more calibration markers, like the vehicle-mounted ECU 100 acquires the maker image data of the non-transitory tangible calibration maker two or more times while the inclination angle of the non-transitory tangible calibration marker with respect to the vehicle A is being changed. Therefore, the vehicle-mounted ECU 100 can further suppress the space for calibration as compared with the case where the non-transitory tangible calibration marker is used.

The vehicle-mounted ECU 100 further includes the calibration start determination unit 42. The calibration start determination unit 42 determines whether or not the vehicle A has stopped. When it is determined that the vehicle A has stopped, the vehicle-mounted ECU 100 starts projection of the calibration marker. According to this, because the vehicle-mounted ECU 100 starts the projection of the calibration marker when the vehicle A is in the stopped state, a decrease in the accuracy of the calibration value due to a temporal change in state of the projection surface during the imaging of the calibration marker is suppressible.

The calibration start determination unit 42 determines whether or not the vehicle A has arrived at a predetermined place in a preset facility. When it is determined that the vehicle A has arrived at a predetermined place in a preset facility, the projection instruction unit 51 causes the projection of the calibration marker to start. With this configuration, since the vehicle-mounted ECU 100 can project the calibration marker in the preset place, it is possible to avoid projecting the calibration marker on a projection surface that is not suitable for the projection. Therefore, the vehicle-mounted ECU 100 can suppress a decrease in the accuracy of the calibration value.

The vehicle-mounted ECU 100 includes the sensor information comparison unit 41. The sensor information comparison unit 41 acquires the image data obtained by the imaging of the detection object by the camera 10 and the detection information obtained by detection of the detection object by a vehicle-mounted sensor other than the camera 10. Based on comparison between the image data obtained with the camera 10 and the detection information obtained with the vehicle-mounted sensor other than the camera 10, the sensor information comparison unit 41 determines whether or not it is necessary to calibrate the camera 10. The vehicle-mounted ECU 100 starts the projection of the calibration marker when it is determined that it is necessary to calibrate the camera 10. With this configuration, the vehicle-mounted ECU 100 can determine the necessity of calibration of the camera 10 from the detection result of the camera 10 and the detection result of another vehicle-mounted sensor, and can execute the calibration processing when the calibration is necessary. Therefore, the vehicle-mounted ECU 100 can execute the calibration processing at the timing when the detection accuracy of the camera 10 is lowered, and can avoid the continued state of lowered detection accuracy of the camera 10. In the above, the camera 10 is an example of first sensor. The vehicle-mounted sensor other than the camera 10 is an example of second sensor.

Second Embodiment

The second embodiment described below is a modification example of the sensor calibration method of the first embodiment. Between the first and second embodiments, like references are used to refer to like parts to avoid redundant description.

The projection instruction unit 51 of the second embodiment causes the Lidar 12 to project the calibration marker. In the second embodiment, the Lidar 12 is configured to be able to project an optical image having a predetermined shape around the vehicle A by irradiating the laser light. For example, in the case of the scanning type, the Lidar 12 can project an optical image by acquiring the projection data item and performing scanning control of irradiating laser light based on the acquired projection data item. In this case, the camera 10 includes a wavelength filter for enabling detection of the reflected light of the laser light from the Lidar 12. The Lidar 12 of the second embodiment is an example of a projection device.

The vehicle-mounted ECU 100 includes a reference estimation unit 252 as its functional block. The reference estimation unit 252 estimates position coordinates of reference feature points of the calibration marker. The reference feature points are position coordinates of the feature points of the calibration marker projected on the projection plane in the coordinate system of the Lidar 12. Specifically, the position coordinates of the reference feature points act as information serving as reference for the below-described detected feature points detected by the camera 10. The reference estimation unit 252 estimates the position coordinates of the reference feature points based on a state of the projection plane. The state of the projection plane includes, for example, a shape of the projection plane, a distance from the vehicle A, an angle with respect to the vehicle A, and the like. The state of the projection plane is detected by the Lidar 12 immediately before or after the projection, for example.

Alternatively, the reference estimation unit 252 may read out and acquire the position coordinates of the reference feature points pre-stored in the memory device 63. In this case, the position coordinates of the reference feature points are initial values obtained by projecting and imaging a calibration marker in advance at a predetermined place of the facility described above, and acquiring the position coordinates of the reference feature points from the imaging data in advance.

Alternatively, the position coordinates of the reference feature points may be values pre-set at the time of manufacture, factory shipment, or the like. In this case, the service provider is provided with information regarding a suitable environment of the vehicle A for the calibration, and based on this information, sets a predetermined place in the facility where the vehicle A is to be parked.

The calculation unit 54 generates the external parameter of the camera 10 relative to the Lidar 12 based on the information provided from the reference estimation unit 252 and the marker image acquisition unit 53. The position coordinates of the reference feature points provided from the reference estimation unit 25 are treated as substantially true values by the calculation unit 54. The calculation unit 54 detects the positions of the feature points from the marker image data as the detected feature points, and generates the external parameter that bring the position coordinates of the detected feature points close to the true values.

Figure 5:
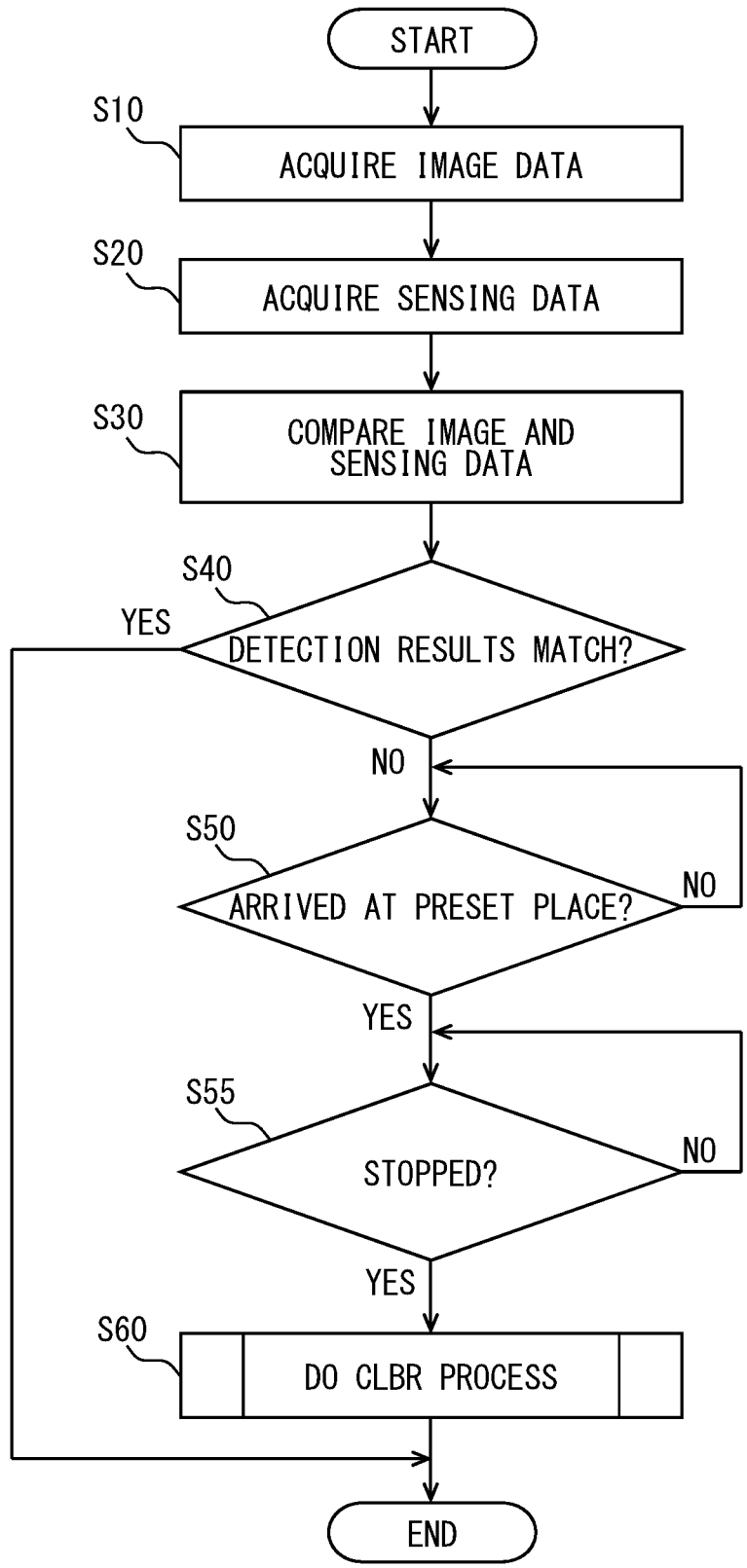
FIG. 5 is a flowchart showing an example of processing executed by a vehicle-mounted ECU.
Figure 6:
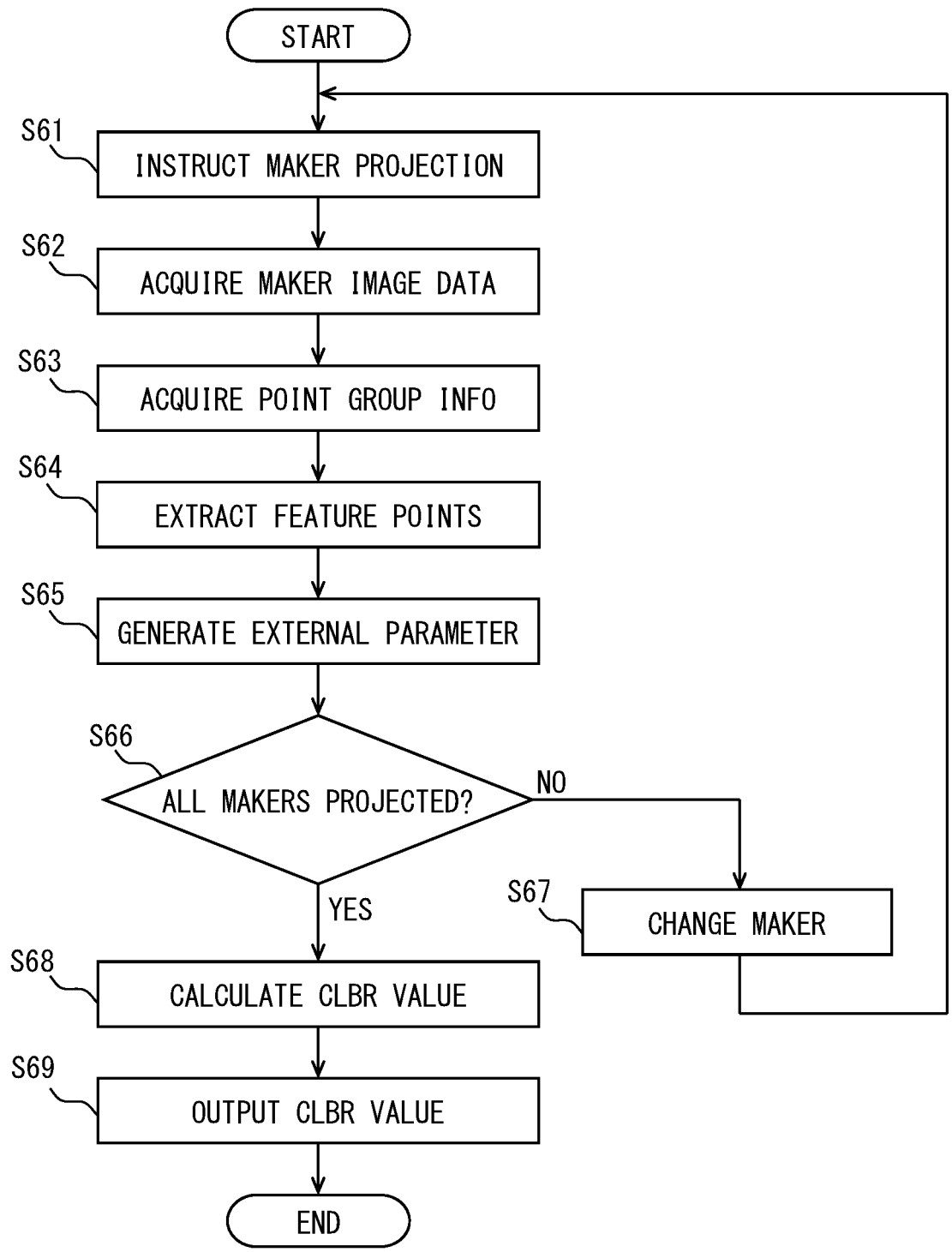
FIG. 6 is a flowchart illustrating details of the calibration processing in FIG. 5.
Figure 7:
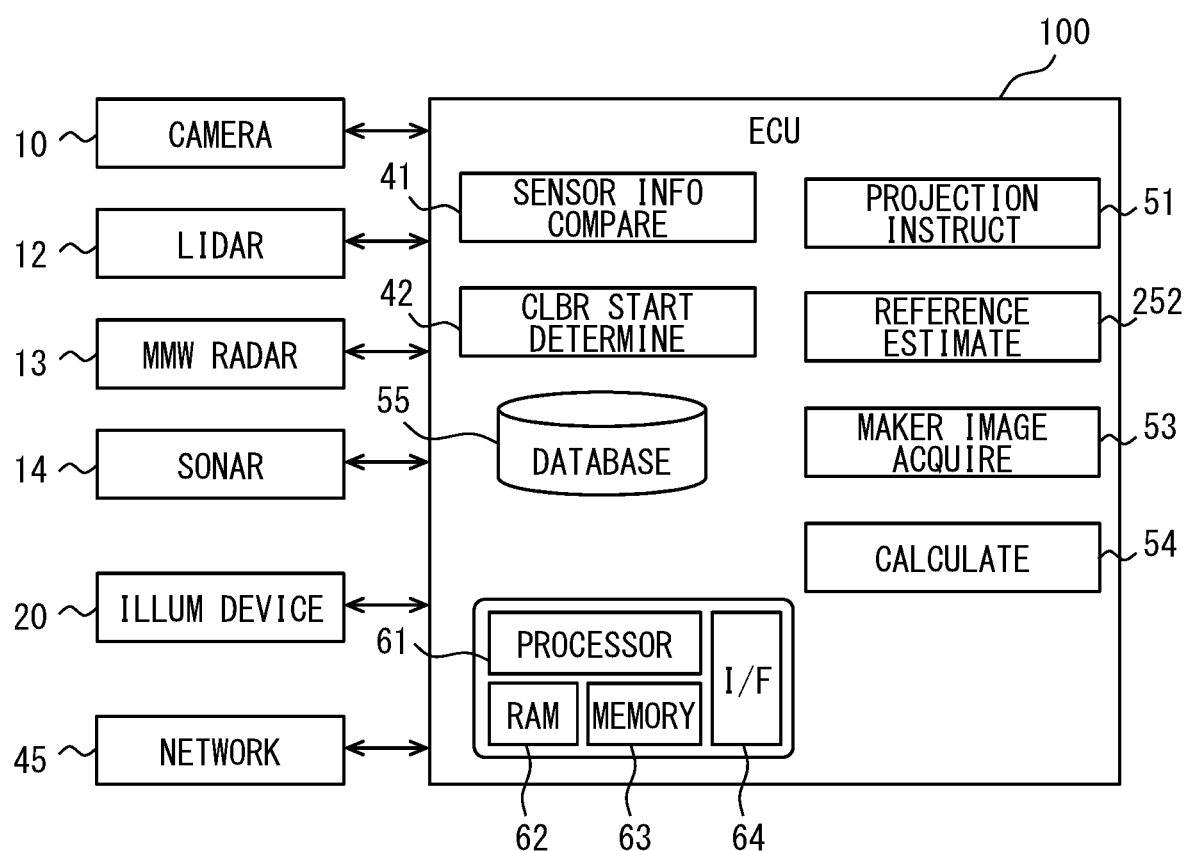
FIG. 7 is a block diagram of a vehicle-mounted ECU of a second embodiment.

The vehicle-mounted ECU 100 performs the start determination of the calibration processing in a way similar to that shown in FIG. 5 of the first embodiment. Further, the vehicle-mounted ECU 100 performs the calibration processing in a way similar to that shown in FIG. 6 of the first embodiment. In that regard however, in the second embodiment, at S61, the vehicle-mounted ECU 100 instructs the Lidar 12 to project the calibration marker instead of the illumination device 20. At S64, the vehicle-mounted ECU 100 extracts the feature points from the marker image data, and estimates the reference feature points from the acquired point group information.

The vehicle-mounted ECU 100 according to the second embodiment causes the Lidar 12 to project a calibration marker. This can eliminate an additional light source for projecting the calibration marker. Furthermore, since the vehicle-mounted ECU 100 detects the state of the projection plane using the Lidar 12, it is possible to suppress limitation on the place where the calibration marker is projected. In particular, by detecting the state of the projection plane using the Lidar 12 and projecting the calibration marker using the Lidar 12, it is possible to suppress an error in the position coordinates of the reference feature points as compared with the case where the calibration maker is projected using another light source.

Third Embodiment

The third embodiment described below is a modification example of the optical sensor calibration method of the first embodiment. In the first embodiment, the vehicle-mounted ECU 100 calibrates the external parameter associated between the camera 10 and the Lidar 12 using a calibration marker projected by the illumination device 20. Alternatively or additionally, the vehicle-mounted ECU 100 may calibrate the external parameter associated between the camera 10 and the vehicle A.

In this case, the vehicle-mounted ECU 100 estimates the position coordinates of the reference feature points of the calibration marker projected by the illumination device 20. Then, the vehicle-mounted ECU 100 generates the external parameter based on the estimated reference feature points and the detected feature points extracted from the marker image data. The reference feature points are initial values that were detected in advance from marker image data captured at a predetermined place in the facility. Alternatively, the reference feature points may be calculated based on the point group information of the projection plane detected by the Lidar 12.

The illumination device 20 is usually mounted to the vehicle A with its optical axis with respect to the vehicle body being adjusted. Therefore, by calibrating the external parameter of the camera 10 based on the calibration marker projected from the illumination device 20, it is possible to calibrate the external parameter associated between the camera 10 and the vehicle A.

Other Embodiments

The present disclosure is not limited to the above illustrated embodiments. The present disclosure covers the illustrated embodiments and modifications implementable by those skilled in the art based on the illustrated embodiments. For example, the present disclosure is not limited to combinations of parts and/or elements shown in the illustrated embodiments. Various combinations of parts and/or elements are implemented as embodiments of the present disclosure. Some embodiments or modifications may include additional parts addable to the illustrated embodiments. The present disclosure covers embodiments or modifications in which parts and/or elements of the illustrated embodiments are omitted. The present disclosure covers part and/or element replacing or combining between one embodiment and another embodiment. The technical scope disclosed is not limited to the description of the illustrated embodiments. The technical scope disclosed is also indicated by claims.

In the above-described embodiments, one example of the vehicle A mounted with the vehicle-mounted ECU 100 is an unmanned driving vehicle providing mobility service. The vehicle A may be a vehicle that is privately owned by a user. The vehicle A may be a vehicle that provides advanced driver assistance to a vehicle driver.

In the above-described embodiments, the illumination device 20 or the Lidar 12 projects the calibration marker. A calibration marker projection device is not limited to these examples. For example, a light source for projecting the calibration marker may be additionally provided in the vehicle A.

Figure 8:
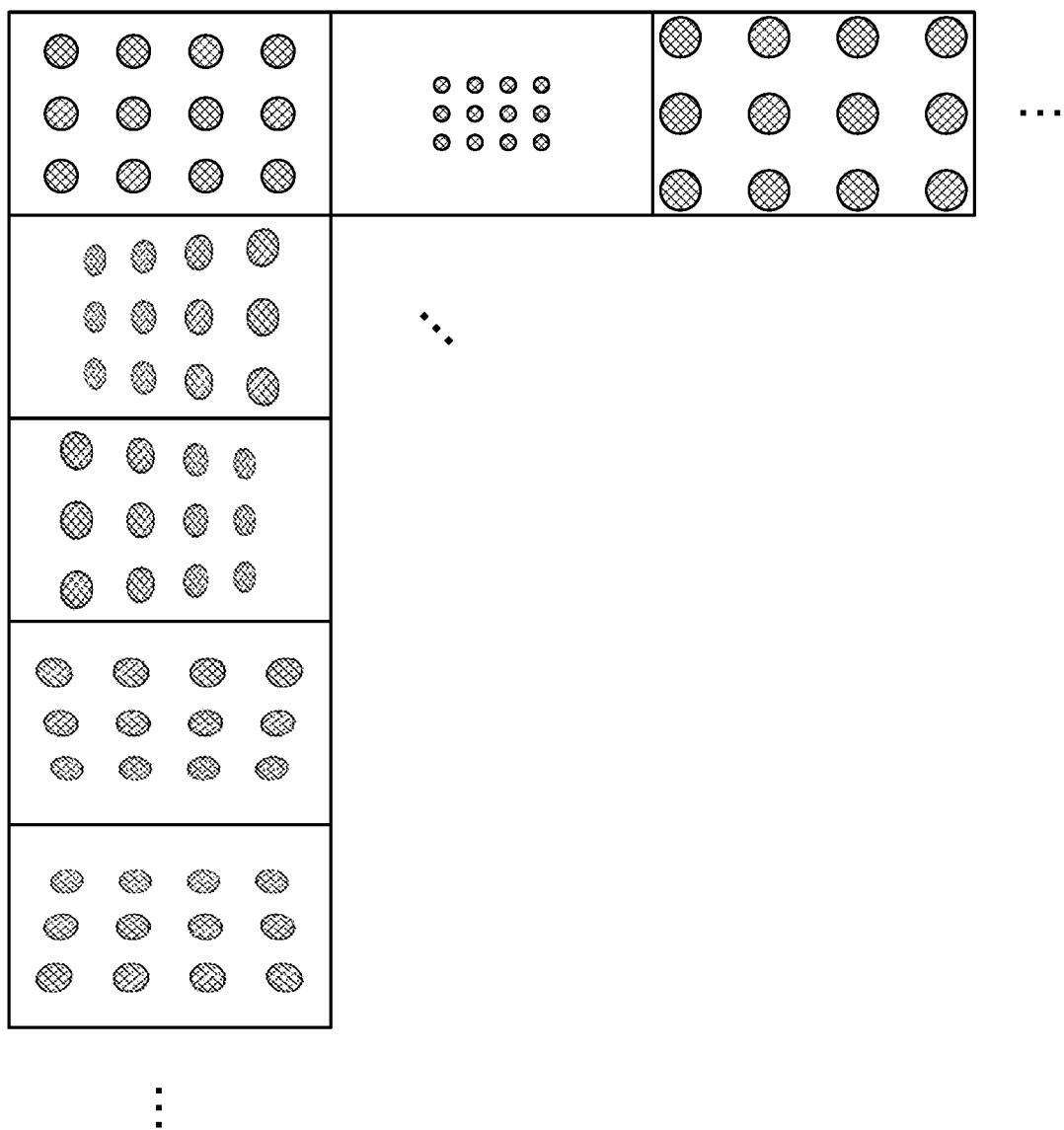
FIG. 8 is a diagram illustrating a projection form of a calibration marker according to another embodiment.

In the above-described embodiments, the calibration marker of the chessboard pattern is projected by way of example. However, the design of the calibration marker is not limited as long as the feature point is extractable. For example, as shown in FIG. 8, the calibration marker may have a design in which circular dots are arranged in a matrix. In the case of such a design, the feature points may be extracted as barycentric points of the dots.

In the above-described embodiments, the vehicle-mounted ECU 100 determines that the calibration processing is necessary when the detection information of the camera 10 and the detection information of another sensor become mismatch in the sensor information comparison unit 41. Alternatively, the vehicle-mounted ECU 100 may be configured to determine that the calibration processing is necessary when a certain period of time has elapsed since the last calibration processing. In this case, the interval for performing the calibration processing may be suitably set based on the required detection accuracy of the camera 10 which may be defined in service contents provided by the vehicle A.

In the above-described embodiments, the vehicle-mounted ECU 100 starts the projection of the calibration marker when the vehicle A is in the stopped state. However, as long as the state of the projection surface does not substantially change, the vehicle-mounted ECU 100 may project the calibration marker during traveling. For example, the vehicle-mounted ECU 100 may start the projection of the calibration marker when the vehicle A is traveling parallel to the wall surface in the facility. In this case, the calibration of the camera 10 having the imaging range at the right and/or left side of the vehicle A is performable by projecting the calibration marker onto the wall surface. Alternatively, the vehicle-mounted ECU 100 may perform the calibration processing by projecting a calibration marker onto the road surface during traveling on a substantially flat road surface. In this case, the vehicle-mounted ECU 100 may determine whether or not the road surface is substantially flat, based on information acquired from the detection result of the vehicle-mounted sensor, high-precision map data, or the like.

In the above-described embodiments, the vehicle-mounted ECU 100 calculates the external parameter of the camera 10 relative to the reference. Alternatively, the vehicle-mounted ECU 100 may calculate not only the external parameter of the camera 10 but also a calibration value of an internal parameter of the camera 10. In some embodiments, the vehicle-mounted ECU 100 may calculate an external parameter associated between cameras 10 such as a stereo camera having imaging ranges overlapping at least partially. In some embodiment the vehicle-mounted ECU 100 may calculate an external parameter of the Lidar 12 relative to the reference.

The processor of the above-described embodiment is a processing unit including one or more CPUs (Central Processing Units). Such a processor may be a processing unit that includes a graphics processing unit (GPU) and a data flow processor (DFP) in addition to the CPU. Further, the processor may be a processing unit including an FPGA (Field-Programmable Gate Array) and an IP core specialized for specific processing such as AI learning and inference. Respective processing circuit portions of such a processor may be individually mounted to a printed circuit board, or may be implemented as ASICs (Application Specific Integrated Circuit), FPGAs, or the like.

Various non-transitory tangible storage medium such as a flash memory and a hard disk are adoptable as a memory device for storing a sensor calibration program or the like. Forms of such storage medium may be changed as appropriate. For example, the storage medium may be in the form of a memory card or the like, and may be configured to be inserted into a slot provided in the vehicle-mounted ECU and electrically connected to the control circuit.

The control unit and method described in the present disclosure may be implemented by a special purpose computer created by configuring a memory and a processor programmed to execute one or more particular functions embedded in the computer program. Alternatively, the control unit and method described in the present disclosure may be implemented by a special purpose computer created by configuring a processor provided by one or more special purpose hardware logic circuits. Alternatively, the control unit and method described in the present disclosure may be implemented by one or more special purpose computers created by configuring a combination of a memory and a processor programmed to execute one or more particular functions and a processor provided by one or more hardware logic circuits. The computer program may also be stored, as instructions executable by a computer, on a computer readable non-transitory tangible storage medium.

What is claimed is:

1. A sensor calibration method performed by at least one processor and comprising:
    projecting an optical image representing a calibration marker onto an area where an imaging range of a first sensor and a detection range of a second sensor other than the first sensor overlap with each other, the first sensor and the second sensor being mounted to a vehicle;
    obtaining optical image information detected by the first sensor and a detection result of the second sensor regarding the projected optical image; and
    calculating, based on the optical image information and the detection result, a calibration value for calibrating an external parameter which is set between the first sensor and the second sensor.

2. The sensor calibration method according to claim 1, wherein:
    the optical image is projected by an illumination device that illuminates a surrounding of the vehicle.

3. The sensor calibration method according to claim 1, wherein:
    the optical image is projected by a Lidar device that irradiates a laser beam and detects an object around the vehicle based on reflected light of the laser beam.

4. The sensor calibration method according to claim 1, wherein:
    projecting the optical image includes projecting a plurality of optical images having different projection forms.

5. The sensor calibration method according to claim 4, wherein:
    projecting the optical image includes projecting a plurality of optical images having different projected sizes.

6. The sensor calibration method according to claim 4, wherein:
    projecting the optical image includes projecting a plurality of optical images including a first optical image having a basic shape and a second optical image having a perspective shape corresponding to the basic shape that is obliquely viewed.

7. The sensor calibration method according to claim 1, further comprising:
    determining whether or not the vehicle has stopped; and
    when it is determined that the vehicle has stopped, starting the projecting of the optical image.

8. The sensor calibration method according to claim 1, further comprising:

determining whether the vehicle has arrived at a predetermined place, which is a preset place; and when it is determined that the vehicle has arrived at the predetermined place, starting the projecting of the optical image.

9. The sensor calibration method according to claim 1, the sensor calibration method further comprising:

detecting an object around the vehicle by the first sensor and the second sensor;

determining whether it is necessary to calibrate the external parameter which is set between the first sensor and the second sensor, based on a detection result of the first sensor concerning the object and a detection result of the second sensor concerning the object; and based on determining that it is necessary to calibrate the first sensor, starting the projecting of the optical image.

10. A sensor calibration apparatus comprising:

a computer including at least one processor;

the computer is configured to:

cause an optical image representing a calibration marker to be projected onto an area where an imaging range of a first sensor and a detection range of a second sensor other than the first sensor overlap with each other, the first sensor and the second sensor being mounted to a vehicle;

acquire optical image information detected by the first sensor and a detection result of the second sensor concerning the projected optical image; and calculate, based on the optical image information and the detection result, a calibration value for calibrating an external parameter which is set between the first sensor and the second sensor.

11. The sensor calibration method according to claim 1, wherein:

the external parameter is a parameter used for converting position coordinates of an object around the vehicle in a coordinate system of the first sensor into position coordinates in a coordinate system of the second sensor.

12. The sensor calibration method according to claim 2, wherein:

the optical image is projected by a headlight mounted to the vehicle.

13. The sensor calibration method according to claim 2, wherein:

the optical image is projected by a taillight mounted to the vehicle.

14. The sensor calibration method according to claim 1, wherein:

the second sensor is a Lidar device that irradiates a laser beam and detects an object around the vehicle based on reflected light of the laser beam, and the optical image is projected by the second sensor.

15. The sensor calibration method according to claim 1, further comprising:

calculating, based on the optical image information, another calibration value of another external parameter which is set between the first sensor and the vehicle.

16. A sensor calibration method performed by at least one processor, comprising:

projecting an optical image representing a calibration marker within an imaging range of an image sensor mounted to a vehicle using a projection device that is mounted to the vehicle thereby;

obtaining optical image information detected by the image sensor; and calculating a calibration value of the image sensor based on the optical image information, wherein the image sensor is a first sensor, the sensor calibration method further comprising:

obtaining a detection result of an object detected by the first sensor detecting the object;

obtaining a detection result of the object detected by a second sensor that detects the object, the second sensor being a vehicle-mounted sensor other than the first sensor;

determining whether it is necessary to calibrate the first sensor, based on comparing the detection result of the first sensor and the detection result of the second sensor; and starting projecting of the optical image based on determining whether it is necessary to calibrate the first sensor.

17. The sensor calibration method according to claim 1, wherein:

the first sensor and the second sensor are different types of sensors.

18. The sensor calibration method according to claim 17, wherein:

the second sensor is a Lidar device that irradiates a laser beam and detects an object around the vehicle based on reflected light of the laser beam.

19. The sensor calibration apparatus according to claim 10, wherein:

the first sensor and the second sensor are different types of sensors.

20. The sensor calibration apparatus according to claim 19, wherein:

the second sensor is a Lidar device that irradiates a laser beam and detects an object around the vehicle based on reflected light of the laser beam.

21. The sensor calibration method according to claim 16, wherein:

the first sensor and the second sensor are different types of sensors.

22. The sensor calibration method according to claim 21, wherein:

the second sensor is a Lidar device that irradiates a laser beam and detects an object around the vehicle based on reflected light of the laser beam.

* * * * *